US007265348B2

(12) United States Patent
Rossier et al.

(10) Patent No.: US 7,265,348 B2
(45) Date of Patent: Sep. 4, 2007

(54) APPARATUS FOR DISPENSING A SAMPLE IN ELECTROSPRAY MASS SPECTROMETERS

(75) Inventors: Joël Stéphane Rossier, Vionnaz (CH); Frédéric Reymond, La Conversion (CH)

(73) Assignee: Diagnoswiss S.A., Monthey (CH)

( * ) Notice: Subject to any disclaimer, the term of this patent is extended or adjusted under 35 U.S.C. 154(b) by 358 days.

(21) Appl. No.: 10/534,301

(22) PCT Filed: Nov. 7, 2003

(86) PCT No.: PCT/EP03/13328

§ 371 (c)(1),
(2), (4) Date: May 9, 2005

(87) PCT Pub. No.: WO2004/051697

PCT Pub. Date: Jun. 17, 2004

(65) Prior Publication Data

US 2006/0113463 A1 Jun. 1, 2006

(30) Foreign Application Priority Data

Nov. 8, 2002 (GB) ................................ 0226160.0

(51) Int. Cl.
*H01J 49/00* (2006.01)
*H01J 49/04* (2006.01)
*B01D 59/44* (2006.01)

(52) U.S. Cl. ...................... 250/288; 250/285; 250/428; 250/435; 250/438; 204/451

(58) Field of Classification Search ................ 250/288, 250/435; 204/451
See application file for complete search history.

(56) References Cited

U.S. PATENT DOCUMENTS 5,306,412 A 4/1994 Whitehouse et al. ... 204/299 R
RE34,757 E * 10/1994 Smith et al. ................ 204/452
5,872,010 A 2/1999 Karger et al. ............... 436/173
5,873,523 A * 2/1999 Gomez et al. ................ 239/3

(Continued)

FOREIGN PATENT DOCUMENTS

EP WO-02/080222 A1 * 10/2002

(Continued)

OTHER PUBLICATIONS

EPODOC, two page English language Abstract for JP 11-002622 A, Jan. 1999.

*Primary Examiner*—Robert Kim
*Assistant Examiner*—Bernard Souw
(74) *Attorney, Agent, or Firm*—Howson & Howson LLP

(57) ABSTRACT

The present invention relates to an apparatus to dispense a sample for subsequent electrospray ionisation (ESI) mass spectrometry (MS) analysis, to a method of fabricating such apparatus and to applications of such apparatus in biological and chemical analysis. The apparatus consists of an electrically non-conductive substrate comprising at least two covered microstructures (generally microchannels) having one extremity formed at the edge of the substrate, one of said microstructures containing the sample to be dispensed into a mass spectrometer by electrospray ionisation and at least a second of said microstructure containing a fluid used as sheath liquid or sheath gas, said at least two microstructures being formed in such a manner that the sample and the sheath liquid/gas come in contact to each other and/or are mixed directly in the Taylor cone of the spray.

28 Claims, 8 Drawing Sheets

U.S. PATENT DOCUMENTS

| | | | | |
|---|---|---|---|---|
| 6,274,867 | B1 | 8/2001 | Wells et al. | 250/288 |
| 6,610,978 | B2 | 8/2003 | Yin et al. | 250/288 |
| 6,766,817 | B2 | 7/2004 | da Silva | |
| 6,803,568 | B2 * | 10/2004 | Bousse et al. | 250/288 |
| 6,918,309 | B2 * | 7/2005 | Brock et al. | 73/863.32 |
| 7,098,450 | B2 * | 8/2006 | Rossier et al. | 250/288 |
| 7,105,812 | B2 * | 9/2006 | Zhao et al. | 250/288 |
| 2002/0130044 | A1 | 9/2002 | Rossier et al. | 204/453 |
| 2003/0104449 | A1 | 6/2003 | Faupel et al. | 435/6 |
| 2003/0196895 | A1 * | 10/2003 | Neususs et al. | 204/451 |
| 2004/0075050 | A1 * | 4/2004 | Rossier et al. | 250/288 |
| 2004/0104449 | A1 * | 6/2004 | Yoon et al. | 257/528 |
| 2004/0112518 | A1 | 6/2004 | Rossier et al. | 156/272.2 |
| 2004/0113068 | A1 * | 6/2004 | Bousse et al. | 250/288 |
| 2004/0166504 | A1 | 8/2004 | Rossier et al. | 435/6 |
| 2004/0231986 | A1 | 11/2004 | Rossier et al. | 204/450 |
| 2005/0047969 | A1 * | 3/2005 | Zhao et al. | 422/100 |
| 2006/0113463 | A1 * | 6/2006 | Rossier et al. | 250/288 |

FOREIGN PATENT DOCUMENTS

| | | |
|---|---|---|
| JP | 11-002622 A | 1/1999 |
| WO | WO 00/30167 | 5/2000 |
| WO | WO 00/58724 | 10/2000 |

* cited by examiner

A)

B)

APPARATUS FOR DISPENSING A SAMPLE IN ELECTROSPRAY MASS SPECTROMETERS

BACKGROUND OF THE INVENTION

In mass spectrometry (MS), one of the intrinsic features of efficient electrospray or nanoelectrospray processes is the need to add volatile buffer and/or solvent to the sample in order to enable efficient evaporation in a controlled buffering environment. This requirement is sometimes incompatible with pre-spray activities that need to be performed for analytical, separation and/or purification purposes or that are required due to the specific properties of these volatile elements of the spray.

Mixing Sheath Liquid and Sample After a Separation

Different strategies have been presented to overcome this problem, which often consist in adding a pressurised flux conventionally called sheath liquid (often methanol, acetonitrile and acetic or formic acid) at the spraying orifice in order to mix the solution to be sprayed with this sheath liquid. In other systems, a sheath gas (i.e. a pressurised flux of gas, e.g. argon) is used to favour the evaporation of the sample solvent. These configurations, standard for electrospray ionisation (ESI), are compatible with systems that work with imposed and relatively high flow-rates of both the sheath liquid/gas and the solution to be sprayed (normally, larger than 5 microL/min).

In other cases, a liquid junction is introduced by means of a T-cell at the end of the electrospray capillary in order to add about 50% of sheath liquid as make-up flow so as to obtain a good spray. Again, these systems are efficient when the flow rates are large enough and well-controlled, but they often create quite large dead volumes which induce sample dilution and hence affect the sensitivity as well as the resolution of the detection.

In a nanoelectrospray, i.e. when the flow-rate is smaller than 5 microL/min, a liquid junction can also be used, but it is very difficult to control it efficiently because the pressure applied to the sheath liquid to mix with the solution to be sprayed often destabilizes the flow in the main sample capillary. In case of separation, this may deeply reduce the resolution of the separated peaks. Finally, when the system is used for electrophoresis, the pressure applied on the sheath liquid can counter the electroosmotic flow and render the plug profile distorted which decreases the resolution of the separation.

In microanalytical devices, the possibility of fabricating different channels and interconnecting them on the same chip enables one to create liquid junctions with a minimum of dead volume, which reduces the sensitivity and resolution losses. Nevertheless, the main difficulty in electrospray and nanospray sampling with sheath liquids is to control the flow-rate of the sheath liquid and that of the sample solution. These flow-rates of course need to be in the same order of magnitude, so as to enable good and stable spray generation while maintaining a sufficiently high proportion of sample for the detection.

In order to control these flow-rates, some authors have derivatised the surface of a side arm to enable electroosmotic flow in the right direction in both channels, (Ramsey et al., Analytical Chemistry, 1997, vol. 69, 1174). Other groups have integrated a liquid junction in the chip that is connected to a sheath liquid syringe through a capillary (R. D. Smith et al., Electrophoresis, 2000, vol. 21, 191). The microfluidic control in these systems is yet quite difficult and necessitates to fill the different arms of the chip without bubbles before starting the spray with real samples.

Reactions in the Nanoelectrospray

Other applications such as chemical or biological reactions in the nanoelectrospray have been demonstrated and are expected to deliver more information on tiny amounts of samples, particularly in proteomics where some digestions could be performed directly in the spray. For example, nanoelectrosprays with immobilised trypsine have been used to digest a peptide and spray it on-line into the MS, thereby enabling the reaction kinetics to be followed. One of the main drawbacks is that the trypsine, which can work in organic solutions, needs a pH of 8.2 to operate, whereas the spray would be more efficient at a pH of 3. As the volume and the flow rate are too small in the nanoelectrospray, it is difficult to introduce a liquid junction to add the sheath liquid. Therefore, these kinds of direct monitoring of reactions are very limited and are not yet considered as analytical tools.

SUMMARY OF THE INVENTION

It is an object of the present invention to add the sheath liquid outside of the spray outlet, which enables nanoelectrosprays of pure aqueous solutions, even at high pH (pH 7 for example) to be generated. The principle here is to add the sheath liquid, preferably without external pressure (syringe, pump or other), directly in the Taylor cone formed at the nanospray outlet, by removing any difficult mixing steps and preconditioning of the spray chip. With the present invention, separation (e.g. electrophoresis) or biological reactions (e.g. affinity, tagging, enzymatic reaction, polymerase chain reaction, etc.) can be performed in pure aqueous solution at any pH and can be conducted until the very end of the column. In addition, the mixing between the sample solution and the sheath liquid can take place in the Taylor cone only.

From a first aspect, the present invention provides an apparatus for dispensing a sample for analysis by electrospray ionization mass spectrometry, said apparatus comprising a substrate of electrically insulating material, the substrate comprising at least two covered microstructures (generally microchannels) both having an outlet at the edge of the substrate where an electrospray is to be generated by application of a voltage, one of said microstructures (hereinafter referred to as “sample microstructure”) containing the sample to be sprayed in a spray and at least one other of said microstructures (hereinafter referred to as “sheath liquid microstructure”) containing a fluid, preferably a sheath liquid or a sheath gas, characterized in that the sample solution and the fluid are arranged to be mixed directly in the Taylor cone of the spray.

The apparatus may further comprise electrical means that allow an electric field to be applied and controlled in both microstructures. The apparatus is notably characterized in that the flow-rates may be controlled in both the sheath liquid and in the sample microstructures, in that it may not be necessary to apply an external pressure to the sheath liquid and/or the sample solution for generating the spray (purely electrokinetic pumping) and in that pure aqueous sample solutions may be sprayed into the MS (due to the mixing with the sheath liquid solution in the Taylor cone). The microstructure surface does not need to be derivatized in order to prevent fluid flow from the sample channel into the sheath liquid channel (or from the sheath liquid channel into the sample channel). In some applications however, portion(s) of the microstructure surface(s) may be functionalized using chemical reaction(s) or immobilization procedures (like e.g. physisorption or covalent binding).

In this invention, the substrate is a solid support made of an electrically insulating material, for instance polymers, ceramics, silicon or glass.

In the present invention, there is no restriction in the microstructure size, shape and/or position. The sample microstructure may have a different shape and different dimensions from the sheath liquid microstructure. Preferably, the microstructures are microchannels that have either width or height of less than 150 micrometers. Otherwise, the microstructures may advantageously form and/or be connected to a network of covered microstructures, so that the apparatus may then constitute and/or be coupled to a micro-total analysis system, which generally consists of a network of capillaries or microstructures used for instance for capillary electrophoresis, chromatography or affinity separation. In some applications, the microstructure may even be reduced to micro-holes created in the thickness of the polymer support or in the layer used to cover one or all microstructures. Also, arrays of apparatuses of this invention may be fabricated in the same polymer support and exposed to the MS. Furthermore, there is no restriction in the technology used to create the microstructures: for instance, embossing, injection molding, casting, wet or chemical etching, physical etching such as laser photoablation, plasma etching or UV-Liga, silicon technology or superposition of layers at least one comprising mechanically drilled grooves, hollows or holes may for instance be used to fabricate the microstructures. In some applications, the microstructures, the reservoirs and the polymer substrate may advantageously comprise electrodes and/or electrical contacts. The electrodes and electrical contacts may be directly integrated during the apparatus fabrication process, and the electrodes may then constitute a portion of one of the microstructure walls. Laser photoablation, plasma etching or superposition of layers comprising mechanically drilled grooves, holes or hollows and/or electrically conducting means would be particularly well suited for such electrodes and/or electrical contact integration.

There is no limitation in the shape of the microstructure outlets. It has been noted that sharp angles may favor the spray generation and stability, but no theoretical explanation has been found for this phenomenon.

In one embodiment of the invention, the microstructures are formed in the same plane, so that the outlets of the sample microstructure and of the sheath liquid microstructure are adjacent. In another embodiment, the microstructure outlets are not in the same plane or even one over the other. In this case, the substrate may be a multilayer body, one layer comprising one of said at least two microstructures and another layer comprising a second of said at least two microstructures. In another option, one microstructure may be formed on one side of the polymer substrate, whereas the second microstructure is formed on the opposite side of the polymer substrate. In a further option, one microstructure may be formed in the cover used to seal the other microstructure (this can notably be the case of a micro-hole formed in the lamination layer used to seal the sample microstructure, said micro-hole being directly used to introduce the sheath liquid solution at or close to the outlet of the sample microstructure where the spray is then generated). For ease of manipulation, it may be advantageous if all microstructures have access holes (or inlet reservoirs) on the same side of the polymer substrate.

In all configurations, it is advantageous that the distance between the outlet of the sample microstructure and that of the sheath liquid microstructure is smaller than 200 μm, so that the Taylor cone formed during the spray encompasses both outlets. This short distance allows efficient mixing of the solutions and prevents formation of liquid drops at the microstructure outlets, which facilitates the spray generation and favors the spray stability. In certain cases, the sample microstructure and the sheath liquid microstructure are connected at the edge of the substrate, thereby forming a unique outlet. In this case, the two microstructures are confounded only at the position of the Taylor cone, and the sheath liquid microstructure is thus different from a liquid junction.

In another embodiment, the apparatus has at least one dimension smaller than 500 micrometers, as in thin film microstructure devices. In this manner, only a small surface surrounds the microstructure outlets, thereby preventing drop formation and hence favoring the spray generation. The apparatus may also be formed in a multilayer substrate, in which each layer of said multilayer substrate may comprise one of at least two microstructures.

In a further embodiment, the outlet ends of the apparatus may exhibit a V-shape in the spraying direction or may be three-dimensionally etched in order to minimize the solid surface area around the outlets and/or to taper in the spraying direction.

In another embodiment, the covered microstructures are sealed by gluing, lamination or pressure application of a polymer foil. Such polymer foil is preferably a thin plastic layer which has to be resistant to the solvents used. In another embodiment, a portion of the sample microstructure may be in direct contact with a supplementary microstructure and/or comprise a solid support such as beads or a membrane separating these two microstructures so as to perform diffusion-controlled assay prior to, but on-line with, MS sampling. This last configuration may be advantageously used for physicochemical characterization of compounds (lipophilicity, permeation tests or the like) or as a purification or separation step. In permeation assays for instance, the membrane separating the two microstructures may contain a solution (generally, an organic phase supported in the membrane which separates two aqueous solutions).

In a preferred embodiment, the polymer substrate and/or the cover are formed in a hydrophobic material. In another embodiment, the surface of the microstructure(s) is hydrophilic so as to favor microfluidic control. For facilitating the spray generation, it may be advantageous to couple both characteristics of hydrophobic substrate material and hydrophilic microstructure surface, since the sample solution would easily flow within the microstructure while drop formation at the outlet will be minimized due to the hydrophobic nature of the substrate surrounding the spray outlet.

In another embodiment, the apparatus comprises conductive means, namely one or a plurality of integrated electrodes that are used to apply the voltage required for the spray generation, to electrokinetically pump the liquids within the sample and/or the sheath liquid microstructure(s), to induce a reaction either in the sample solution or in the sheath liquid, to perform electrochemical detection of a compound or any combination thereof. In a further embodiment, one electrode is integrated in the polymer support at a controlled position close to the microstructure outlet(s) and is in contact with the solutions placed in the microstructure(s). In another embodiment, the polymer support further integrates a second electrode placed at the microstructure inlet(s) or in a reservoir surrounding the inlet(s). In any of the above configurations, the conductive means may comprise a metallic layer, a conductive ink, a conductive polymer e.g. polypyrrole or polyaniline, a conductive gel, an ion permeable membrane such as an ionode, or any combination thereof. The voltage used to generate the spray as well as the spraying current density may thus be controlled by this electrically conductive means. In some applications, this conductive means may be an external electrode in contact with one or more of the inlet reservoir(s) of the microstructure(s).

For certain applications, the sample should not be in direct contact with the electrically conductive means per se. In such a case, the conductive means may comprise an conductive electrolyte such as an organic material, an aqueous gel or solution, a sol-gel or any material that physically isolates the electrode from the sample while maintaining electrical conductivity of the system.

In some applications, the sample microstructure and the sheath liquid microstructure may be put in electrical contact. In this manner, a high voltage may for instance be imposed along the sheath liquid microstructure in order to initiate the spray and to maintain it, whereas a second voltage may be superimposed in the sample channel. This superimposed voltage may induce a flow of sample solution. A power supply may be connected to each microstructure in order to generate the required applied voltage. The spray source of the mass spectrometer may be used to apply the voltage in one of the microstructures (generally in the sheath liquid microstructure). An independent power supply may then be used to apply the voltage in the second microstructure (generally the sample channel). In this manner, the MS entrance and the power supply are connected to ground and the electric fields are applied in the two microstructures. If the sample microstructure is electrically connected to the sheath liquid microstructure, a floating potential may then be applied between the two microstructures to control the electric field in both microstructures.

In another embodiment of the invention, the sheath liquid microstructure contains a solution that is volatile enough to be used as a sheath liquid. Methanol, acetonitrile or mixtures of methanol or acetonitrile and water are examples of such solutions that are also commonly used in electrospray ionization mass spectrometry. The solution contained in the sheath liquid microstructure may advantageously contain acid(s) or base(s) that favor(s) ionization of the sample to be dispensed into the MS. In another embodiment, the sample and/or sheath liquid solution(s) may also comprise a compound that will be ionized upon generation of the spray and further dispensed into the MS. Such compounds may be advantageously used as internal standards and may notably serve as calibrator(s) for quantitative MS analyses.

In another embodiment, the sheath liquid microstructure contains a gas. This gas may be an inert gas such as nitrogen, argon, helium or the like, serving e.g. to favor the spray generation and/or to prevent the formation of droplets at the microstructure outlet. For some applications, a reactive gas such as oxygen or a mixture of inert and reactive gases may also be used so as to generate a reaction with the sample solution.

The sample and sheath liquid solutions may be applied directly in the inlet reservoirs of the respective microstructures and sprayed into the MS, even without application of an external force (e.g. back pressure).

Generally, the apparatus is supported in a device facilitating the handling of the apparatus and/or allowing precise positioning of the spray tip (microstructure outlet) in front of the MS entrance. The supporting device may advantageously comprise liquid connection means (e.g. at least one capillary) to enable easy sample and/or sheath liquid introduction in the microstructures of the apparatus (and generally with minimized dead volumes), as well as electrical connections for application of the electric field(s). The dispensing of the sample by electrospray ionization may also be automated and/or computer controlled, thereby enabling the control of the entire MS analyses (sample introduction, spray generation, flow-rates of sample and sheath liquid solutions in the microstructures, mixing of the two solution in the Taylor cone, sample ionization, MS detection mode, etc.).

In some embodiments, the sample microstructure is connected to other separation or detection means, e.g. a chromatography column, an electrophoresis unit, a membrane, a desalting step, etc. In another embodiment, the sample microstructure may also comprise a separation means, such as a solid phase (e.g. a membrane, beads and/or a section of the microstructure wall), a chromatography medium or a capillary electrophoresis system. For applications where the sample channel is coupled to and/or comprises a separation means, e.g. capillary electrophoresis, it may be advantageous to integrate a decoupler located between the separation means or the separation part of the sample microchannel and the sample outlet.

In a further embodiment, compounds may be coated, adsorbed or bound on the microstructure surface. This may notably be used for physicochemical characterization of compounds (e.g. solubility assays), where the sample to be characterized is coated on the walls of the sample microstructure. The solution in which the solubility has to be assessed is then introduced in the sample microstructure, and the sample dissolved in this solution after a given time may then be measured by mass spectrometry using the apparatus of this invention.

In another embodiment, the sample microstructure contains a biological material, e.g. proteins, enzymes, antibodies, antigens, sugars, oligonucleotides or cells, which may be immobilized or covalently bound to the microstructure surface or to a solid support (e.g. a membrane, a gel, a sol-gel or beads), so that enzymatic, affinity, activity, immunological and/or cellular assays may be performed in the sample microstructure.

Many reactions that do not support solvents conventionally used in mass spectrometry (e.g. organic solvents like acetonitrile or methanol) may be performed in the apparatus of this invention since the sample may be a purely aqueous solution. Enzymatic reactions, affinity tests, solubility assays, enzymatic or chemical digestion, sample derivatisation as well as electrochemically induced reactions (e.g. protonation, tagging using quinones or any other redox reactions) may thus be performed in the sample microstructure prior to dispensing into the mass spectrometer. The apparatus of this invention may also be advantageously used for molecular interaction studies.

From a second aspect, the present invention provides a method of dispensing a sample into a mass spectrometer from an apparatus as defined above. The method is characterized in that the electric field may be applied in both the sample and the sheath liquid microstructures and that the flow-rates of the solutions contained in these two microstructures may thus be controlled, thereby allowing to control the mixing of sample and sheath liquid solutions in the Taylor cone and hence their proportion in the spray. The method of this invention may advantageously be used for dispensing an aqueous sample solution into a mass spectrometer, even at high as well as at low flow rates, and even at high pH values.

The method of this invention may also comprise introducing a compound of known concentration in either or both of the sample and/or the sheath liquid solutions (internal standard(s) used for calibration) so as to enable quantitative MS detection of an analyte. In addition, the introduction of internal standards in the solutions may be used to measure the proportion of sample and sheath liquid solution sprayed and to assess the efficiency of the spray and/or of the mixing of the solutions in the Taylor cone.

The method may further comprise coupling the MS detection of a compound with purification or separation of the sample solution (e.g. by chromatography, capillary electrophoresis, affinity coupling, desalting, etc.) Similarly, the method may comprise immobilizing molecules of the sample reversibly on a solid support (e.g. a membrane or beads) and releasing said molecules from the solid support into the sample microstructure by spraying a buffer or by a gradient of different solvents. This solid support may also comprise at least one or a plurality of immobilized affinity agent(s) such as antibodies, antigens, oligonucleotides, DNA strains and the like. The method may also comprise performing solubility assays, in which the sample microstructure may for instance be coated with a compound of interest before introduction and further spraying of a solution in which said compound dissolve.

From a third aspect, the present invention provides a method of fabricating an apparatus for dispensing a sample for subsequent analysis by electrospray mass spectrometry, comprising the step of taking a substrate of electrically insulating material, and fabricating at least two covered microstructures, both having an outlet at the edge of the substrate so that the solutions to be sprayed from the microstructures through these outlets are mixed in the Taylor cone.

In one embodiment, the substrate may be a multilayer body, one layer comprising one of said at least two microstructures and another layer comprising another of said at least two microstructures. The microstructures may be fabricated independently in the two layers. In this manner, the apparatus of the present invention may be fabricated by assembling two or more of the above layers (e.g. by gluing them together or by laminating them one over the other) in such a manner that a multi-layer substrate is formed with at least two covered microstructures, both having an outlet at the edge of the substrate so that the solutions to be sprayed from the microstructures through these outlets are mixed in the Taylor cone.

In a further embodiment, the microstructure outlets at the edge of the substrate may be fabricated by cutting the substrate in its thickness, e.g. by mechanical means such as a punch.

The method of fabrication may further comprise steps to integrate electrical means directly in the substrate, said substrate thus comprising at least one conductive portion.

When the substrate is a polymer, the covered microstructures may be formed by laser photoablation, UV-Liga, embossing, injection molding, solvent casting, light or thermally induced polymerization, silicon technology or superposition of layers, at least one of said layers comprising mechanically drilled grooves, hollows or holes. The conductive portion of the substrate may also be formed by the deposition of an ink, conductive polymer, ion exchange material, metal deposition, sputtering or other. Alternatively, the microstructures and/or the conductive portion may be formed by plasma etching, photoablation or chemical etching. Conductive substrate portions formed in these ways are ideal for applying a high voltage in the microchannel in order to generate a stable spray for feeding a mass spectrometer.

The conductive substrate portion may in particular be formed by making a recess in the substrate and filling the recess with electrically conductive material.

An analytical instrument comprising an array of apparatuses, each according to the invention, can be used in a method of analyzing a plurality of samples, each apparatus being used in turn to collect a sample, and each sample can be dispensed from the respective apparatus, and analyzed by mass spectrometry. Said samples may be collected from an analytical system, e.g. a chromatograph, an electrophoretic unit, a separation unit or an affinity system.

BRIEF DESCRIPTION OF THE DRAWINGS

The invention is hereinafter described in more detail, by way of example only, with reference to the accompanying figures, in which:

FIG. 3A is a plan of an array of apparatuses formed on one support;

FIG. 3B shows possible different cross-sections for the apparatuses of FIG. 3A, taken along line a;

DETAILED DESCRIPTION OF THE INVENTION

Figure 1:
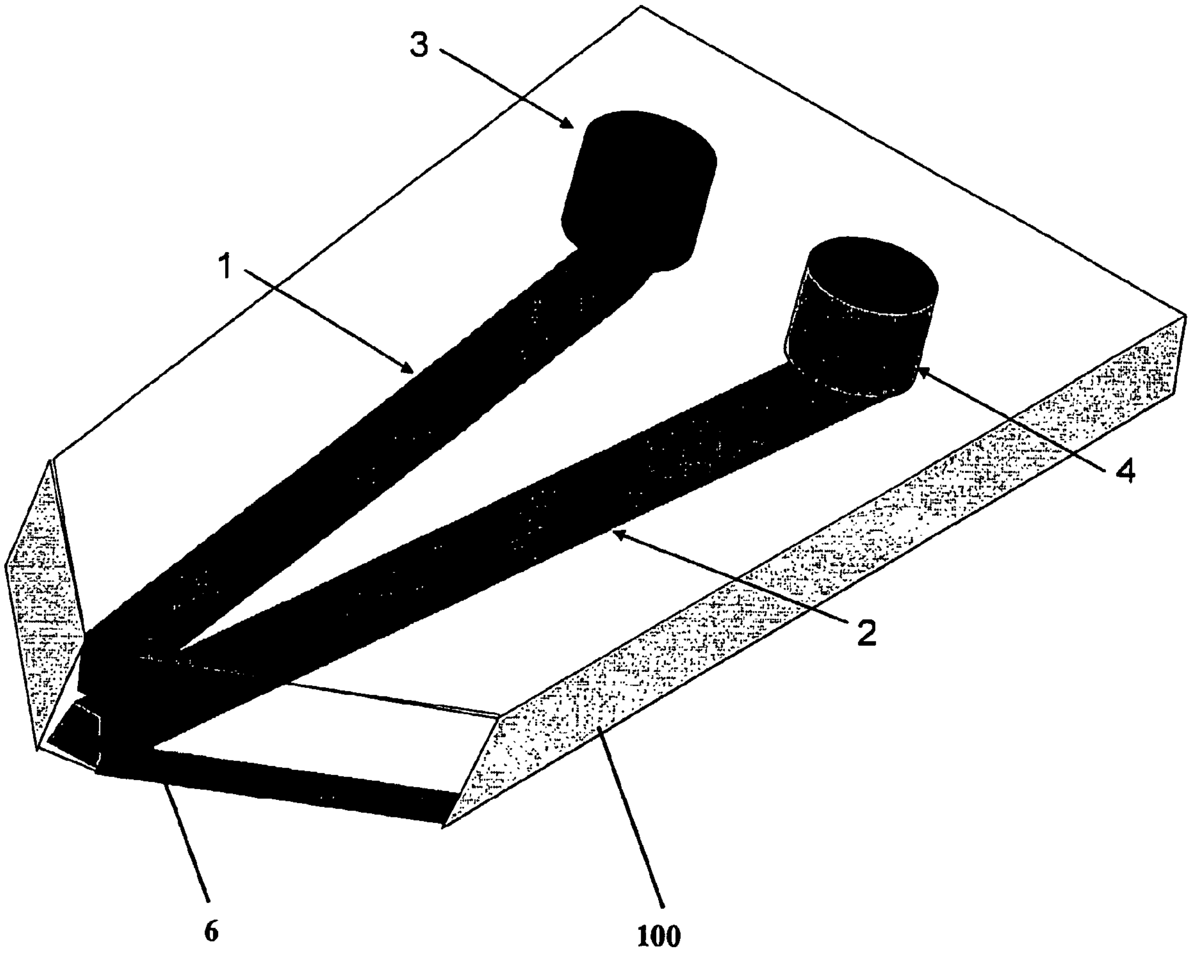
FIG. 1 is a schematic perspective view of an apparatus according to an embodiment of the invention.

FIG. 1 is an example of apparatus according to the present invention which is made in a substrate 100 and which comprises two covered microstructures, namely a sample microchannel 1 and a sheath liquid microchannel 2 that are connected to inlet reservoirs 3, 4 respectively, placed on the same side of the support 100 for fluid introduction. FIG. 1 also illustrates that the microstructures have an outlet 6 formed at the edge of the support, at which the spray is to be generated upon voltage application.

Figure 2:
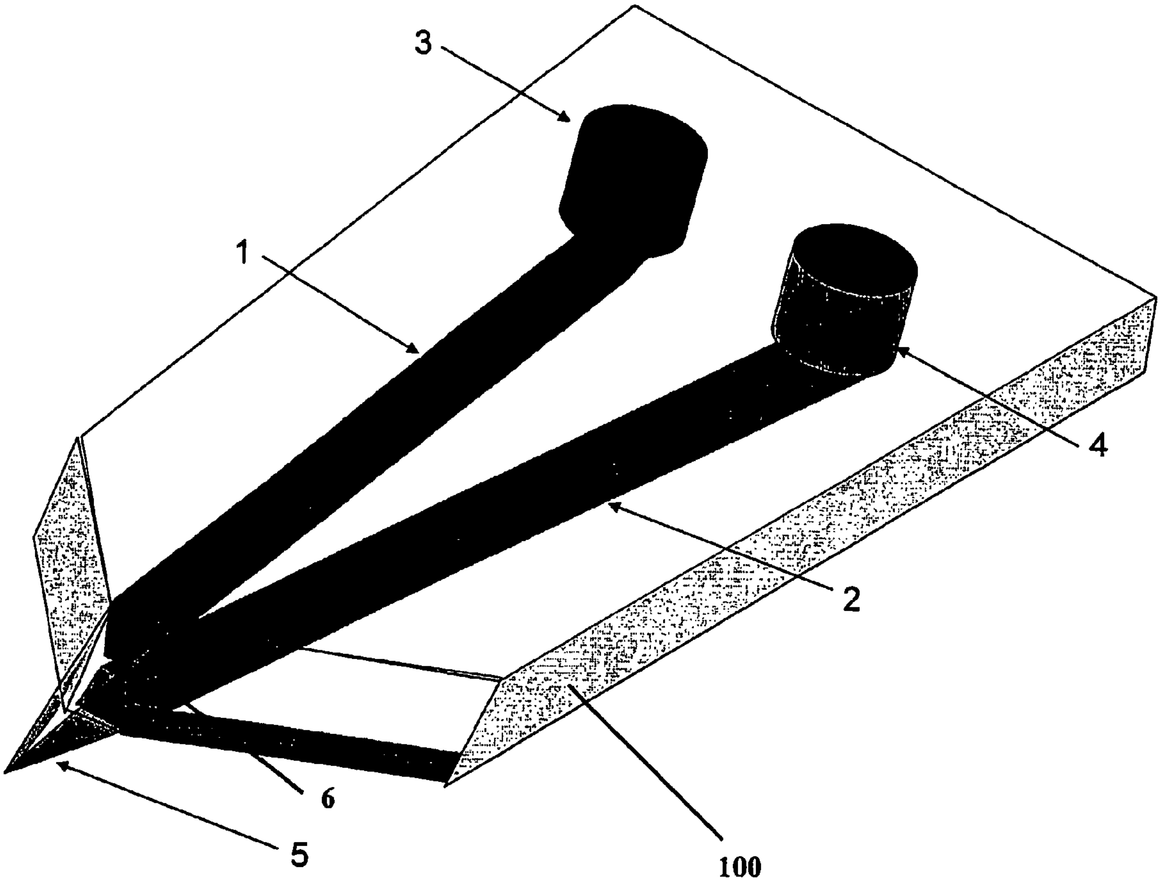
FIG. 2 shows the apparatus of FIG. 1 in use.

FIG. 2 shows the apparatus as in FIG. 1, with the Taylor cone 5, formed upon potential application, encompassing the outlets 6 of both the sample and sheath liquid microchannels, so that the sample solution mixes with the sheath liquid solution directly in the Taylor cone.

Figure 3:
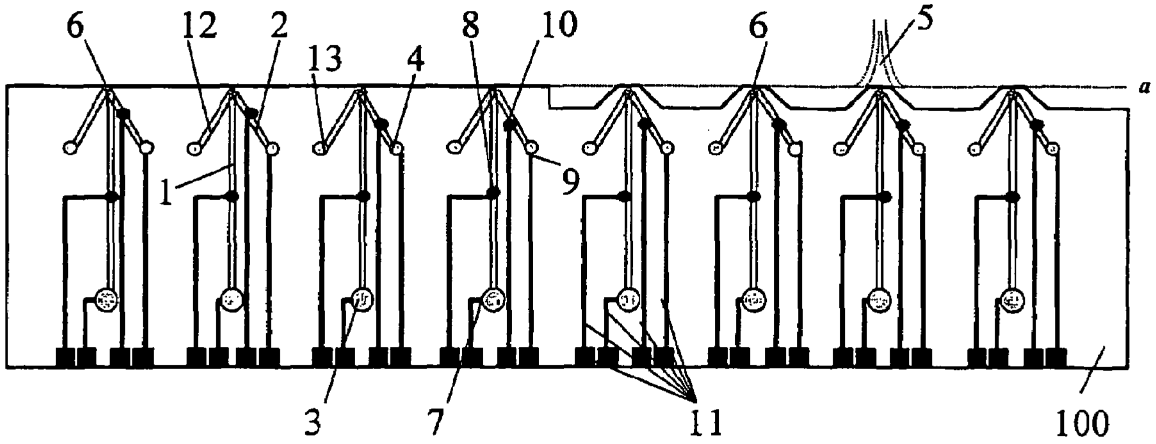
Figure 3:
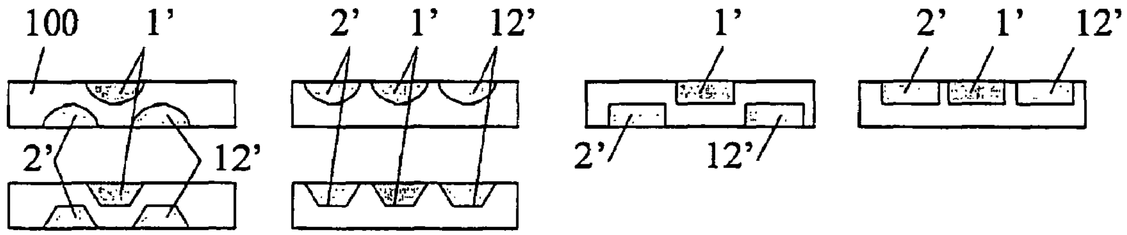

FIG. 3A shows an example of an array of apparatuses fabricated on the same support 100, said apparatuses comprising one sample microstructure 1, one sheath liquid microstructure 2 and one supplementary (but optional) microstructure 12 (all are microchannels in the present example) that are respectively connected to reservoirs 3, 4 and 13 and that have one outlet extremity 6 formed at the edge of the support where the Taylor cone 5 is created upon generation of the spray. This figure further illustrates that the support may be cut straight across or in a tip shape in order to decrease the solid surface area around the microstructure outlets and that the support may integrate electrical means such as conducting pads 11 and/or electrodes 7, 8, 9 or 10 that are placed either in the microstructures or in contact with the microstructure inlets.

FIG. 3B represents a variety of cross sections (along axis a of FIG. 3A) of one of the apparatuses shown in FIG. 3A and illustrates that the microstructure outlets may have various types of shapes and dispositions.

Figure 4:
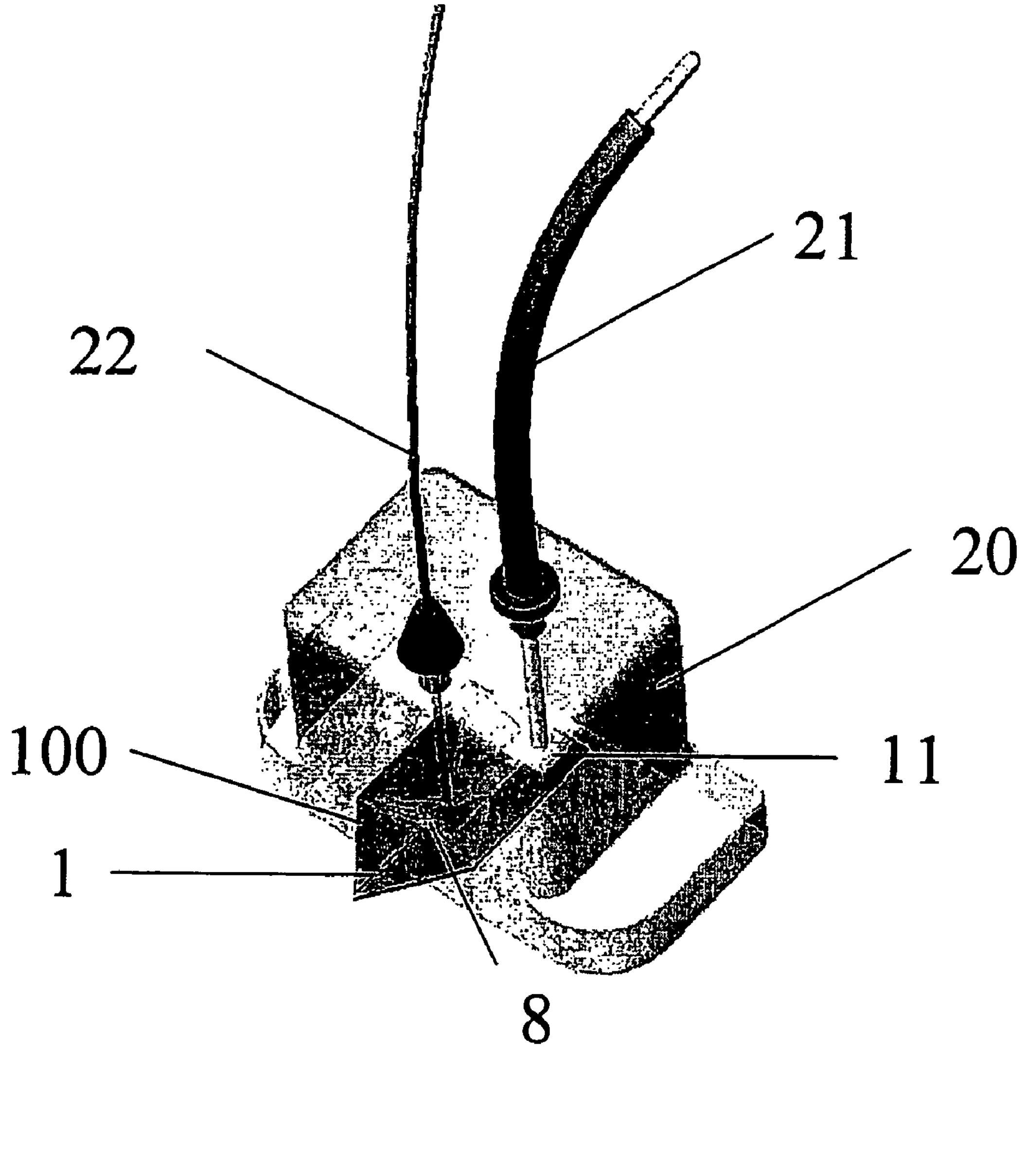
FIG. 4 shows a device that can be used to support the apparatus of the present invention.

FIG. 4 shows an example of a device that can be used to support the apparatus of the present invention. In this example, the supporting device 20 comprises an electrical contact 21 connected to an electrical pad 11 integrated in the substrate 100 comprising the sample microstructure I and at least one sheath liquid microstructure (not shown). The supporting device 20 further comprises a fluid connection means (here a capillary) which allows the introduction of fluids at the inlet of the sample microstructure.

Figure 5:
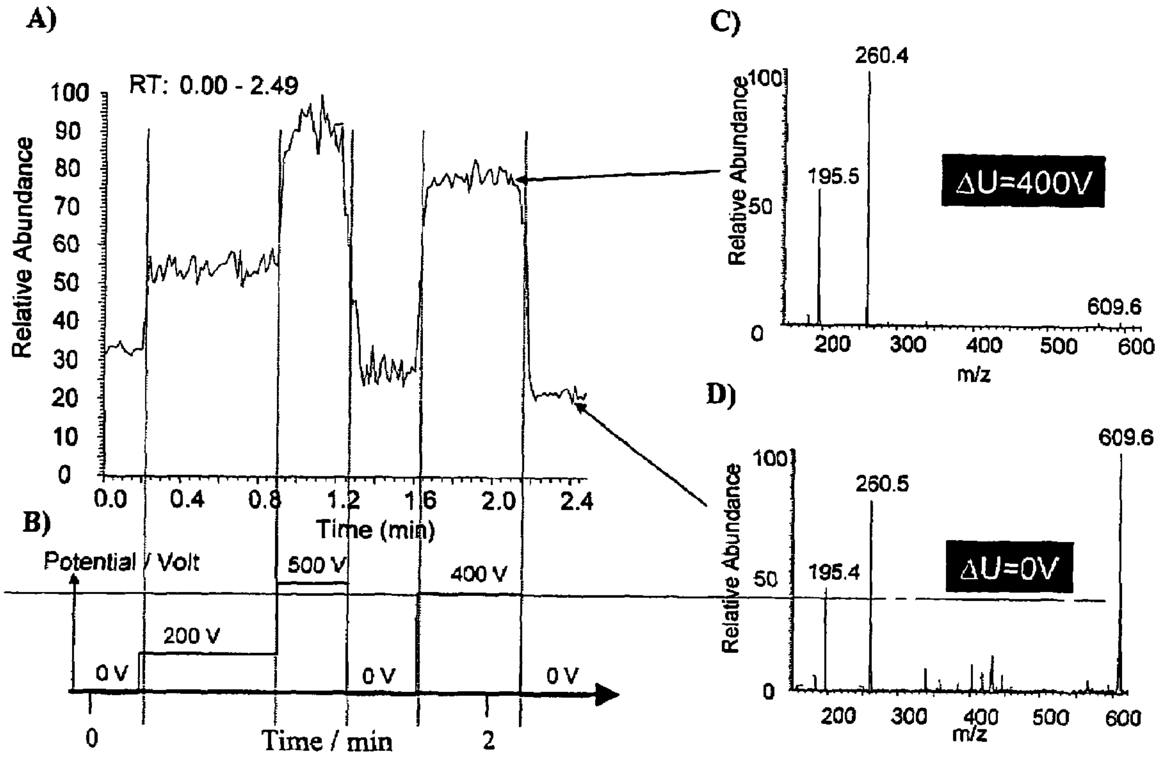
FIG. 5A shows the evolution of the mass spectrum at m/z=as a function of time, in an experiment carried out using apparatus according to the invention.
FIG. 5B shows the evolution of AU as a function of time.
FIG. 5C is an example of a mass spectrum obtained with a potential difference between the sample and the sheath liquid microstructures of 400 Volts.
FIG. 5D is an example of a mass spectrum obtained with a potential difference between the sample and the sheath liquid microstructures of 0 Volt.

FIG. 5 shows the evolution of the mass spectrum intensity as a function of the difference of applied voltage between the sample microstructure and the sheath liquid microstructure, ΔU, using an example of apparatus of the present invention in which the sample solution is an aqueous solution of 100 μM propanolol and caffeine in 10 mM ammonium acetate at pH 5.5 and the sheath liquid solution is a solution of reserpine in methanol containing 1% acetic acid. FIG. 5A shows the evolution of the mass spectrum at m/z=as a function of time and FIG. 5B shows the evolution of ΔU as a function of time. FIG. 5C is an example of a mass spectrum obtained upon a potential difference between the sample and the sheath liquid microstructures of 400 Volts, whereas FIG. 5D is an example of a mass spectrum obtained upon a potential difference between the sample and the sheath liquid microstructures of 0 Volts.

Figure 6A:
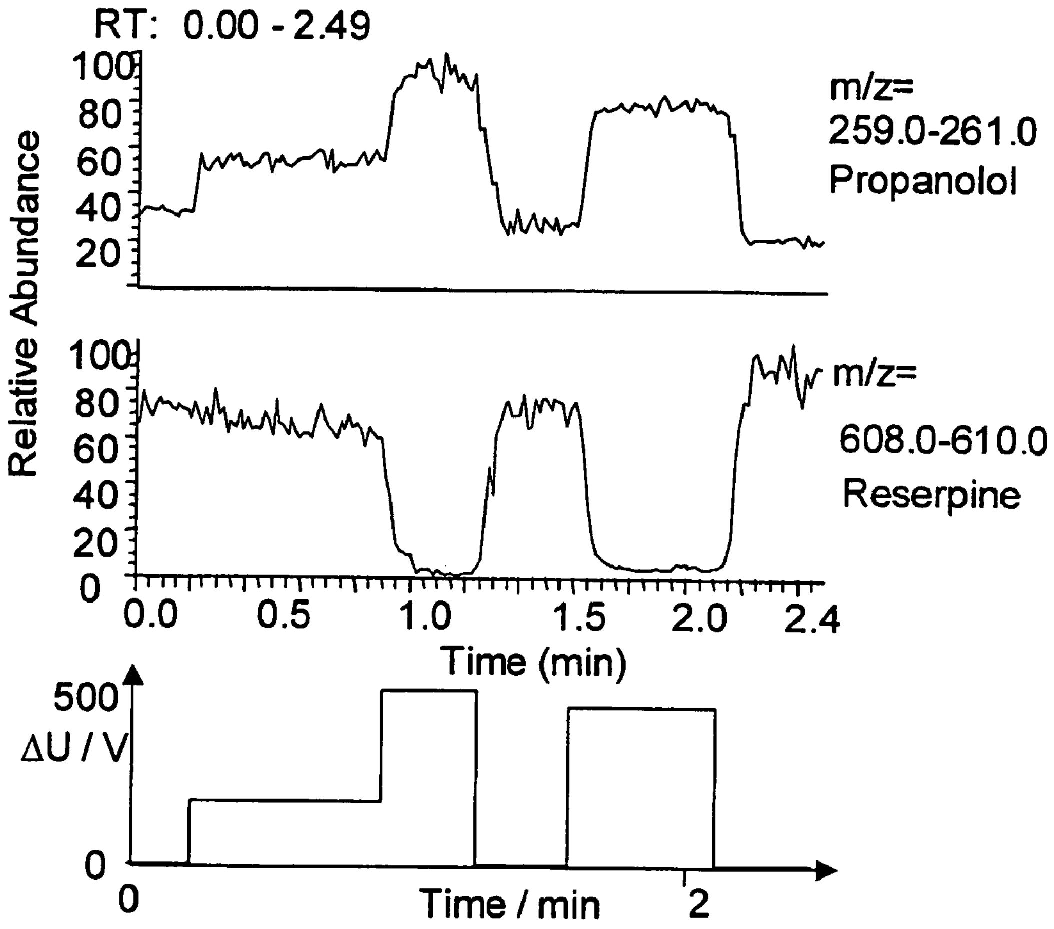
FIG. 6A shows the evolution of the mass spectrum intensity of propanolol and of reserpine as a function of time upon variation of the difference of applied voltage between the sample microstructure and the sheath liquid microstructure, $\Delta U$.
Figure 6B:
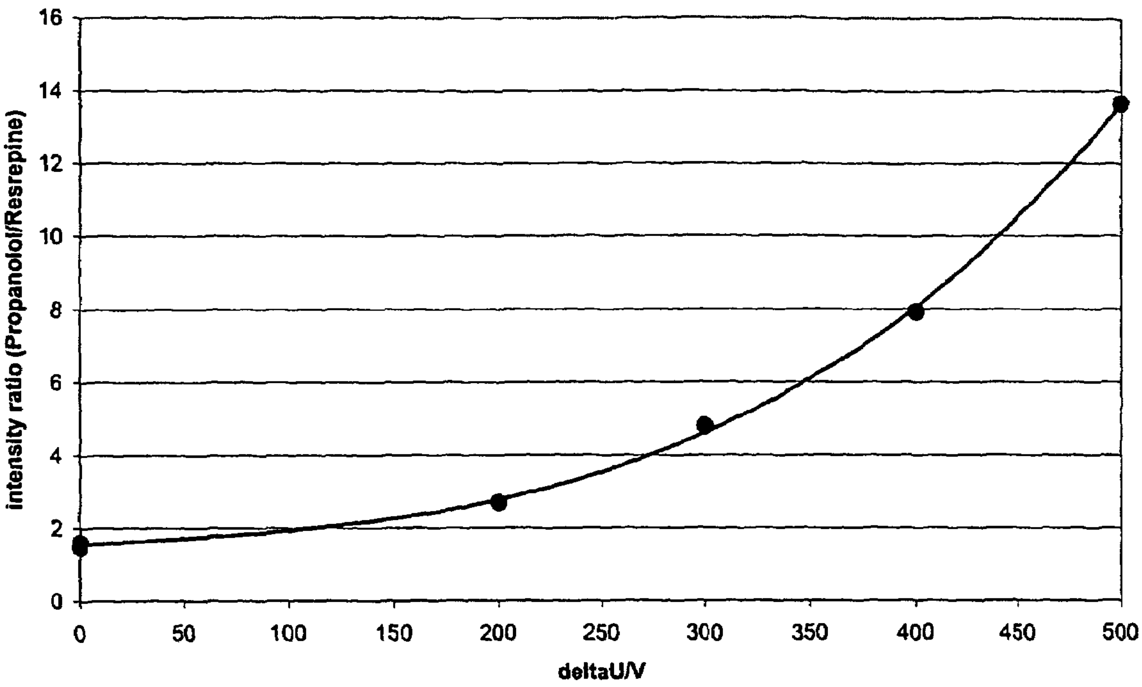
FIG. 6B shows the evolution of the ratio of the mass spectrum intensity of propanolol over that of reserpine as a function of $\Delta U$, for the experimental data of FIG. 6A.

FIG. 6A shows the evolution of the mass spectrum intensity of propanolol (i.e. at the mass-over-charge ratio of m/z=259-261) and of reserpine (m/z=608-610) as a function of time upon variation of the difference of applied voltage between the sample microstructure and the sheath liquid microstructure, ΔU. FIG. 6B shows the evolution of the ratio of the mass spectrum intensity of propanolol over that of reserpine as a function of ΔU, for the experimental data of FIG. 6A.

Figure 7:
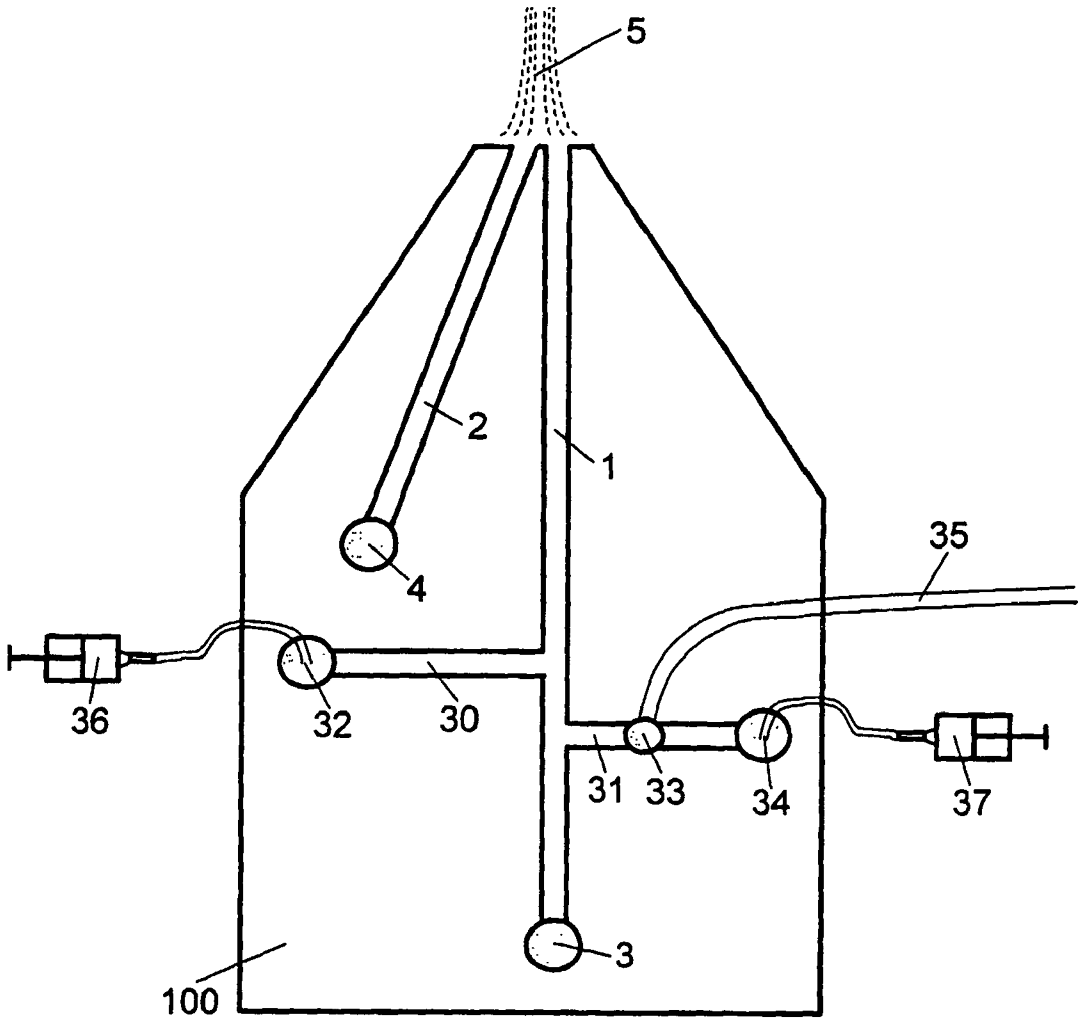
FIG. 7 shows an apparatus according to another embodiment of the invention.

FIG. 7 shows an example of apparatus of the present invention, in which the sample microstructure 1 is directly connected to a network of microchannels 30 and 31 comprising various connection reservoirs 32 and, respectively 33 and 34. The reservoirs 32 and 34 are connected to pumping means 36 and 37 (electrokinetic or mechanical pumping systems, symbolized here by syringe pumps), whereas reservoir 33 is connected to a capillary that allows sample introduction. Such a configuration of apparatus may be advantageously used for connection to a separation system such a high-performance liquid chromatography column or a capillary electrophoresis unit. The sample may be continuously pushed into the inlet 33, whilst the pumping means allows control of the direction of sample flow and hence the injection of the sample in the sample microstructure. As an example, the pumping means 37 may be used in pulling mode in order to aspirate the solution arriving from the capillary 35 at the inlet 33, while the pumping means 36 is used in a pushing mode in order to further force the fluid to flow from inlet 33 to reservoir 34 which is then used as a connection to the waste. By switching the pumping means 37 and 36 to pushing and, respectively, pulling, the sample solution flows from inlet 33 towards reservoir 32. The sample solution may then be injected into the sample microstructure 1 by application of a voltage between reservoir 3 and the spray outlet of the sample channel. This configuration of apparatus allows very accurate injection of the sample and, in some applications, the sample may be further separated within the sample microstructure prior to being sprayed.

The concept of the present invention is demonstrated by way of the following experimental data obtained with an apparatus similar to that schematically shown in FIG. 1. The apparatus comprised two plasma etched microchips made of a polyimide foil having a thickness of 75 μm, comprising one microchannel (~60 mm×~120 mm×~1 cm) sealed by lamination of a 38 μm thick polyethylene/polyethylene terephthalate layer and one microelectrode (~52 μm diameter gold electrode) integrated at the bottom of the microchannel. The two polyimde chips were glued together and further mechanically cut in a tip shape, in such a manner that this multilayer system exhibits two microstructures both comprising a microchannel having an outlet at the edge of the polymide layers, thereby forming an apparatus where the outlets of the sample and sheath liquid microstructures were superposed and where the Taylor cone could be formed similarly to the configuration shown in FIG. 2. With this apparatus, the thickness of the support separating the two microstructure outlets was less than 50 micrometers. It should also be noted here that the apparatus further comprised inlet reservoirs at the entrance of both the sample and the sheath liquid microstructures. A polystyrene well was further glued on the top of each reservoir so as to increase the volume of sample and sheath liquid solution to be placed in the apparatus. In addition, the integrated electrode was not used to apply the voltage in the present experiments. To generate the spray, the voltage can be applied directly in the polysterene reservoirs, for instance 2 kV being applied in the sheath liquid reservoir and 2 to 2.5 kV in the sample reservoir.

In order to use this apparatus to dispense an aqueous sample solution into an electrospray mass spectrometer (here a LCQ-Duo from Finnigan, USA), an example of a method is described hereinafter:

1) place the apparatus in front of the MS entrance with the microstructure outlets directed toward the MS orifice (typically from few micrometers to few centimeters)

2) fill the sample microstructure 1 by capillary action for example with an aqueous sample solution (here 10 mM ammonium acetate at pH 5.5 with 100 μM propanolol and caffeine) by depositing a drop in the sample reservoir (typically a solution volume of few nanoliters to few microliters);

3) fill the sheath liquid microstructure 2 by capillary action with a sheath liquid solution (here methanol containing 0.1 or 1% acetic acid and 100 μM reserpine) by depositing a drop in the sheath liquid reservoir;

4) start the spray in the sheath liquid microchannel 2 by applying a voltage (here 2 kV) in the sheath liquid reservoir 4;

5) pump the sample solution in the sample microstructure 1 by applying a supplementary voltage (+ΔU=100 to 500 V) between the sample and the sheath liquid reservoirs 3 and 4 in order to generate a flow of sample solution by electrokinetic pumping.

As a demonstration, FIG. 5 shows the evolution of the mass spectrum intensity as a function of the difference of applied voltage between the sample microstructure and the sheath liquid microstructure, ΔU, using the above described example of apparatus and method. FIG. 5A clearly shows that the total MS intensity varies with time, and follows the time variation of the supplementary voltage ΔU applied in the sample microstructure. When ΔU is large, the MS intensity is high, which corresponds to the increased ion concentration detected by the MS due to the large proportion of sample solution sprayed. When ΔU decreases, the MS intensity decreases since the proportion of sheath liquid solution increases.

This is also confirmed by the full spectra shown in FIGS. 5C and 5D that have been measured at ΔU values of 400 and 0 V, respectively. At ΔU=400 V, the largest peak intensity is recorded at m/z=260.4 (corresponding to propanolol), whereas the peak at m/z=609.6 (corresponding to reserpine) is very low, which signifies that the proportion of sample solution sprayed is large. In contrast, at ΔU=0 V, reserpine is detected with the highest intensity, whereas propanolol is detected in much lower intensity than at ΔU=400 V, thereby confirming that the proportion of sample solution sprayed is much lower than at ΔU=400 V. This is further exemplified in FIG. 6A, which shows the time evolution of the mass spectrum measured for propanolol and reserpine upon variation of ΔU.

The ratio of the peak intensity measured for propanolol over that measured for reserpine may be reported as a function of ΔU. As exemplified in FIG. 6B, this ratio drastically increases with ΔU, which is in agreement with an increased proportion of sample solution sprayed. Such a calibration curve may then be used to evaluate the flow rates in the sample and sheath liquid microstructures. As illustrated in FIGS. 5C and 5D, the ratio of the peak intensities for propanolol and caffeine, which are both present in the sample solution, remain the same upon variation of ΔU. This also shows that the calibration curve of FIG. 6B may further be used for the quantitative determination of a compound. In such a case, reserpine and e.g. caffeine may be used as internal reference for both the sheath liquid and the sample solution.

It must be stressed here that the supplementary voltage ΔU will only be applied in the channels if there is a liquid connection between the sample and the sheath liquid microstructures. In the present invention, this liquid "bridge" is the Taylor cone generated by the first voltage. In this manner, the apparatus of this invention is particularly efficient because the pumping in the sample microstructure (aqueous sample solution) is effective only after that the spray has been initiated (thereby minimizing undesired cessation of the spray). In addition, the flows of sample and sheath liquid solutions in the Taylor cone may be easily varied by changing the value of the imposed supplementary voltage ΔU. By addition of a compound of known concentration in each solution, the proportion of the sheath liquid and sample solutions sprayed can be monitored by the intensity recorded by the mass spectrometer. This strategy also enables perform quantitative MS analysis to be performed with much greater accuracy than conventional methods.

The invention claimed is:

1. An apparatus for dispensing a sample for analysis by electrospray ionisation mass spectrometry, said apparatus comprising a substrate of electrically insulating material, the substrate comprising at least two covered microstructures both having an outlet at an edge of the substrate where an electrospray is to be generated by application of a voltage and an inlet for fluid introduction, one of said microstructures containing a sample solution to be sprayed and at least one other of said microstructures containing a second fluid, a sheath liquid or a sheath gas, the sample solution and the second fluid, sheath liquid or sheath gas being arranged to be directly mixed in a Taylor cone of the electrospray.

2. An apparatus according to claim 1, wherein said substrate is a multilayer body in which at least two layers of said multilayer body each comprise one of said at least two micro structures.

3. A method of fabricating an apparatus for dispensing a sample for subsequent analysis by mass spectrometry, comprising the steps of taking a substrate of electrically insulating material, fabricating at least two covered microstructures, both having an outlet at an edge of the substrate where a spray is to be generated by application of a voltage and an inlet for fluid introduction, so that the sample and a sheath liquid solution to be sprayed from the microstructures through the outlets are mixed in a Taylor cone of the spray.

4. A method of fabricating an apparatus according to claim 3, comprising the step of taking a substrate which is a multilayer body, fabricating at least one covered microstructure in a plurality of layers, assembling said plurality of layers and cutting the assembled multilayer body, so as to obtain at least two covered microstructures, both having an outlet at the edge of the substrate where the spray is to be generated by application of a voltage and an inlet for fluid introduction, so that the sample and sheath liquid solutions to be sprayed from the microstructures through the outlets are mixed in the Taylor cone.

5. An apparatus according to claim 1, wherein said apparatus has a thickness smaller than 500 μm.

6. An apparatus according to claim 1, further comprising at least one electrically or ionically conductive means for applying a voltage to the sample solution or sheath liquid, said conductive means having a controlled size and location.

7. An apparatus according to claim 6, wherein said at least one electrically or ionically conductive means is integrated in a wall of one of said microstructures or is in contact with the sample solution or the sheath liquid at the inlet of one of said microstructures.

8. An apparatus according to claim 1, wherein a distance between the outlet of the sample microstructure and that of the sheath liquid microstructure is smaller than 200 μm.

9. An apparatus according to claim 8, wherein the sample microstructure and the sheath liquid microstructure are connected at the edge of the substrate, thereby forming a single outlet.

10. An apparatus according to claim 1, wherein at least one of said sample microstructure and said sheath liquid microstructure communicates with a network of microstructures.

11. An apparatus according to claim 1, wherein said covered microstructures are sealed by gluing, lamination or pressure application of a polymer foil.

12. An apparatus according to claim 1, wherein said sample microstructure contains one of a biological material, a chemical material, proteins, enzymes, antibodies, antigens, sugars, oligonucleotides, DNA, cells, and an organic compound, which is filled in said microstructure or which is coated, immobilized or covalently bound to a surface of said microstructure or to a solid support comprising one of a membrane, gel, solgel, and beads, so as to perform one of a biological assay, enzymatic assay, affinity assay, activity assay, immunological assay, cellular assay, chemical assay, solubility test, permeability test, lipophilicity test, enzymatic digestion, chemical digestion, sample derivatisation, electrochemically induced reaction, protonation, tagging using quinones, and redox reaction.

13. An apparatus according to claim 1, wherein said sample microstructure comprises a separation means, comprising at least one of a chromatography medium, a capillary electrophoresis system, and a solid phase selected from a membrane, beads and a section of a microstructure wall.

14. An apparatus according to claim 1, wherein said apparatus is supported in a device for precise positioning of at least one of the microstructure outlets in front of a mass spectrometer entrance, for facilitating electrical connections with one or a plurality of power supplies, or for introducing the sample solution or sheath liquid with minimized dead volume.

15. A method of dispensing a sample for subsequent analysis by electrospray mass spectrometry, comprising the steps of:

utilizing a substrate of electrically insulating material having at least two covered microstructures each with an inlet for fluid introduction and an outlet at an edge of the substrate for generating an electro spray, one of said microstructures containing a sample solution and at least one other of said microstructures containing a sheath liquid solution;

applying a voltage to the sheath liquid solution to initiate the electrospray; and imposing another voltage to the sample solution to induce a flow of sample, such that both said sheath liquid and sample solutions are mixed directly in a Taylor cone of the electro spray.

16. A method according to claim 15, wherein the proportion of sheath liquid solution and sample solution sprayed is controlled by the difference of the voltage applied in the sheath liquid solution and that applied in the sample solution.

17. A method according to claim 15, further comprising the step of introducing a compound of known concentration in either or both of the sample and sheath liquid solutions.

18. A method according to claim 17, further comprising the steps of controlling the proportion of sheath liquid solution and sample solution sprayed and performing quantitative mass spectrometry analysis.

19. A method according to claim 15, further comprising the steps of immobilizing molecules of the sample reversibly on a solid support and releasing said molecules from the solid support into the sample microstructure by a spraying buffer or gradient of different solvents.

20. A method according to claim 19, wherein a chemical reaction or an affinity reaction occurs in or on said solid support prior to the releasing step.

21. A method according to claim 15, further comprising the step of filling said sample microstructure with, or immobilizing or covalently binding to the surface of said microstructure or to a solid support provided as one of a membrane, a gel, a solgel, and beads, one of a biological or a chemical compound, proteins, enzymes, antibodies, antigens, sugars, oligonucleotides, DNA, cells, and an organic compound, so as to perform one of a biological assay, an enzymatic assay, an affinity assay, an activity assay, an immunological assay, a cellular assay, a chemical assay, a solubility test, a permeability test, a lipophilicity test, enzymatic or chemical digestion, sample derivatisation, electrochemically induced reactions, protonation, tagging using quinones, and redox reactions, with subsequent analysis by electrospray mass spectrometry.

22. A method according to claim 3, further comprising the step of integrating electrically or ionically conductive means for applying a voltage to the sample or sheath liquid solution, said conductive means having a controlled size and location.

23. A method according to claim 22, wherein said conductive means is formed by one of laser photoablation, plasma etching, chemical etching, deposition of an ink, deposition of a conductive polymer, integration of an ion exchange material, metal deposition, and sputtering.

24. A method according to claim 22, wherein said conductive means is integrated in a cover of the microstructures.

25. A method according to claim 3, wherein the microstructures are formed by one of laser photoablation, UV-Liga, embossing, injection molding, solvent casting, light or thermal induced polymerization, silicon technology, and superposition of layers with at least one comprising mechanically drilled grooves, hollows or holes.

26. A method according to claim 3, wherein a plurality of apparatuses are fabricated in the same substrate, thereby creating an array of apparatuses.

27. A method of performing a chemical or biological assay, comprising the step of using one or an array of apparatuses with detection by electrospray mass spectrometry, each apparatus being a substrate of electrically insulating material, the substrate having at least two covered microstructures each having an inlet for fluid introduction and an outlet at an edge of the substrate where an electrospray is generated by application of a voltage, one of said microstructures containing a sample solution to be sprayed and at least one other of said microstructures containing a second fluid, the sample solution and the second fluid are arranged to be directly mixed in a Taylor cone of the electrospray.

28. A method according to claim 27, wherein said chemical or biological assay is selected from a group consisting of an enzymatic assay, an affinity assay, an activity assay, an immunological assay, a cellular assay, a solubility test, a permeability test, and a lipophilicity test.

* * * * *